(12) United States Patent
Uehara et al.

(10) Patent No.: US 7,423,163 B2
(45) Date of Patent: *Sep. 9, 2008

(54) PROCESS FOR PRODUCING CONCENTRATE OF CONJUGATED FATTY ACID

(75) Inventors: Hidetaka Uehara, Yokosuka (JP);
Tomomi Suganuma, Yokosuka (JP);
Satoshi Negishi, Yokosuka (JP);
Toshihisa Suzuki, Yokosuka (JP)

(73) Assignee: The Nisshin Oillio Group, Ltd., Chuo-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/902,349

(22) Filed: Sep. 20, 2007

(65) Prior Publication Data

US 2008/0027238 A1 Jan. 31, 2008

Related U.S. Application Data

(63) Continuation of application No. PCT/JP2006/306634, filed on Mar. 30, 2006.

(30) Foreign Application Priority Data

Mar. 30, 2005 (JP) ............................. 2005-098770

(51) Int. Cl.
*C11C 3/14* (2006.01)
*C11B 3/02* (2006.01)

(52) U.S. Cl. ..................... 554/125; 554/207; 554/208

(58) Field of Classification Search ................ 554/125, 554/207, 208
See application file for complete search history.

(56) References Cited

U.S. PATENT DOCUMENTS 2,895,976 A * 7/1959 Kairys et al. ............... 554/177

6,743,609 B1 * 6/2004 Rosson et al. .............. 435/134

FOREIGN PATENT DOCUMENTS

| JP | 58-198423 A | 11/1983 |
| JP | 11-514887 A | 12/1999 |
| JP | 2001-169794 A | 6/2001 |
| JP | 2001-169795 A | 6/2001 |
| JP | 2003-113396 A | 4/2003 |
| JP | 2004-23810 A | 1/2004 |
| JP | 2004-248671 A | 9/2004 |
| WO | WO 97/18320 A1 | 5/1997 |

OTHER PUBLICATIONS

Hidetaka Uehara et al., "A Novel Method for Solvent Fractionation of Two CLA Isomers", Journal of the American Oil Chemists' Society, 2006, vol. 83, No. 3, pp. 261-267.
O. Berdeaux et al., "A Simple Method of Preparation of Methyl trans-10, cis-12-and cis-9, trans-11-Octadecadienoates from Methyl Linoleate", Am. Oil. Chem. Soc., vol. 75, No. 12, pp. 1749-1755, 1998.
PCT/ISA/210.

* cited by examiner

*Primary Examiner*—Yvonne Eyler
*Assistant Examiner*—Yate K Cutliff
(74) *Attorney, Agent, or Firm*—Buchanan Ingersoll & Rooney PC

(57) ABSTRACT

An easy and inexpensive process by which a concentrate of a given unsaturated fatty acid can be obtained from a mixture which has conventionally been difficult to concentrate. The process, which is for producing a concentrate of a desired isomer (a) from a conjugated fatty acid mixture (A), is characterized by comprising: a step in which the conjugated fatty acid mixture (A) is mixed with at least one unsaturated fatty acid (B) to obtain a mixture solution containing the isomer (a) dissolved therein; a crystallization step in which either crystals rich in the isomer (a) or crystals poor in the isomer (a) are precipitated from the mixture solution; and a solid-liquid separation step for obtaining the crystals rich in the isomer (a) or for obtaining a solution rich in the isomer (a) by removing the crystals poor in the isomer (a).

15 Claims, No Drawings

PROCESS FOR PRODUCING CONCENTRATE OF CONJUGATED FATTY ACID

BACKGROUND OF THE INVENTION

1. Field of the Invention

The present invention relates to a method for the preparation of a condensate of a conjugated fatty acid, which permits the concentration of any conjugated fatty acid incapable of being purified according to the currently used fractional crystallization technique.

2. Description of the Related Art

The conjugated linoleic acid (CLA) has recently been attracted special interest since it possesses wide variety of physiological effects such as an effect of improving the metabolism of lipids, an effect of reducing the body fat, anti-cancer effect, an anti-allergic effect, and an anti-arteriosclerotic effect. The term "conjugated linoleic acid" means the generic name of fatty acids each having a conjugated double bond in the molecule and having 18 carbon atoms and a kind of fatty acid contained in meat and dairy products. It has in general been known that the conjugated linoleic acid can be prepared according to the alkali-conjugation technique (see Japanese Patent No. 3,017,108) while making use of an organic solvent represented by propylene glycol. The conjugated linoleic acid prepared according to this production method is an equimolar mixture comprising 9c, 11t-conjugated linoleic acid (9-cis, 11-trans-conjugated linoleic acid) and 10t, 12c-conjugated linoleic acid (10-trans, 12-cis-conjugated linoleic acid). In this respect, it has been known that these two isomers differ from one another in their physiological activities and side-effects and there has also been desired for the development of a condensate thereof which is enriched with a desired isomer.

On the other hand, as methods for the purification of fatty acids, there have been known, for instance, the fractional crystallization technique, the distillation technique, the urea adduct technique, the silver complex-forming technique, the enzymatic technique (using, for instance, a lipase). However, the distillation technique is not useful because a conjugated fatty acid has generally a high boiling point and is not heat-stable. In addition, the urea adduct method is likewise quite useful for the purification of fatty acids, but it is not suitable when the fatty acids purified by this method are used in food products and the practice thereof also requires great expense. Moreover, the silver complex-forming technique is also a method quite useful for the purification of unsaturated fatty acids, but it is not suitable when the fatty acids purified by this method are used in food products and the practice thereof also requires great expense. Furthermore, the enzymatic method requires a high production cost and it also requires the use of complicated operations. Finally, the fractional crystallization technique is a quite excellent method for the purification of fatty acids and, in general, it has widely been used, but it would be difficult to purify fatty acids having solidifying points very close to one another such as isomers of a conjugated fatty acid.

Up to now, there have likewise variously been investigated many methods for concentrating a specific conjugated linoleic acid to thus give a condensate thereof. For instance, there has been reported a method for isolating isomers which comprises the steps of reacting a conjugated linoleic acid with, for instance, methanol under acidic conditions to form a methyl ester derivative thereof and then precipitating the same in the form of crystals (see, for instance, Non-patent Article 1 specified below). However, this method requires the use of a step for derivatization of the conjugated linoleic acid and this would result in an increase of the production cost thereof and further the resulting product must be hydrolyzed after the separation of the reaction product in this method. In case where the desired conjugated linoleic acid is concentrated through the crystallization of the reaction product, but it is difficult to obtain any concentrate thereof having a sufficiently high content of a target substance. Further, there has also been known a concentrating method through chromatography, but this method requires great expense because of the use of a solvent and a column.

There has likewise been reported a method for purifying isomers of a conjugated linoleic acid, which comprises the step of subjecting a fatty acid mixture comprising isomers of a conjugated linoleic acid or glyceride esters of the isomers to a selective reaction carried out in the presence of a lipase and in a reaction system free of any organic solvent (see, for instance, Patent Article 1 specified below). Another method has been reported, which comprises the steps of reacting a mixture containing isomers of a conjugated linoleic acid with octanol in the presence of a lipase to thus change the compositional ratio of the isomers of the conjugated linoleic acid present in the octanol ester fraction (see, for instance, Patent Article 2 specified below). Moreover, a method has likewise been reported, which comprises subjecting isomers of a conjugated linoleic acid to a selective esterification reaction with a linear higher alcohol in the presence of a lipase to thus give a 9c, 11t-conjugated linoleic acid-containing fatty acid (see, for instance, Patent Article 3 specified below).

However, these methods make use of quite expensive lipases and they require the use of an additional operation (such as distillation step) for separating reaction products from un-reacted starting substances since they are ones in which any desired product is isolated based on the difference in the reactivity between each isomer of an unsaturated fatty acid with an alcohol or the difference in the susceptibility, to hydrolysis, of the derivatized isomers of an unsaturated fatty acid, observed in the presence of such lipases. In addition, regarding the derivatives of isomers, these methods further require the use of an extra operation such as an additional hydrolysis of such derivatives even after the isolation thereof. This may further increase the production cost. Moreover, the resulting product would not be favorable as an ingredient for foods depending on the kinds of alcohols used (for instance, in case wherein octanol is used as such an alcohol).

Patent Article 1: Japanese Un-Examined Patent Publication 2004-023810;

Patent Article 2: Tokuhyo Hei 11-514887;

Patent Article 3: Japanese Un-Examined Patent Publication 2001-169794; and

Non-Patent Article 1: O. Berdeaus, J. Voinot, E. Angioni, P. Jurneda and J. L. Sebedio, J. Am. Oil. Chem. Soc., 1998, 75:1749-1755.

BRIEF SUMMARY OF THE INVENTION

Accordingly, it is an object of the present invention to provide a simple and cost-saving method which permits the production of a concentrate enriched with a specific or desired isomer starting from a mixture of a conjugated fatty acid mixture whose concentration has conventionally been quite difficult.

It is another object of the present invention to provide a method for preparing an esterified product using the foregoing concentrate.

These and other objects of the present invention will be clearer from the following detailed description.

The inventors of this invention have conducted various studies to solve the foregoing problems associated with the conventional techniques and have succeeded in preparing a concentrate enriched with a desired isomer of a conjugated linoleic acid, by the addition of a specific unsaturated fatty acid (oleic acid) to a mixture containing isomers of such a conjugated linoleic acid and the subsequent crystallization of the mixture. The inventors have thus completed the present invention on the basis of the foregoing knowledges.

According to a first aspect of the present invention, there is provided a method for preparing a concentrate of a desired isomer (a) from a conjugated fatty acid mixture (A), wherein the method comprises the steps of mixing the conjugated fatty acid mixture (A) with at least one unsaturated fatty acid (B) to obtain a mixed solution containing the desired isomer (a) dissolved therein; crystallizing crystals rich in the isomer (a) from the mixed solution or crystals poor in the isomer (a) from the mixed solution; and solid-liquid separating for recovering crystals rich in the isomer (a) or for removing the crystals poor in the isomer (a) to recover a solution rich in the isomer (a).

According to a second aspect of the present invention, there is provided a method for preparing an esterified product comprising the step of esterifying a compound having at least one alcoholic hydroxyl group in the molecule with a concentrate of unsaturated fatty acids prepared according to the foregoing method of the present invention.

As has been discussed above, the present invention permits the preparation of a concentrate enriched with a desired conjugated fatty acid starting from a mixture whose concentration has conventionally been considered to be very difficult according to a cost-saving method and the method of the present invention is quite simple since it only comprises a crystallization/separation step and a step for removing solvents/unsaturated fatty acids.

In addition, the resulting concentrate can be used in food products and mono-glycerides (MG), di-glycerides (DG), tri-glycerides (TG) and the like prepared using the concentrate can likewise be applied to food products.

DETAILED DESCRIPTION OF THE INVENTION

The present invention relates to a method for preparing a concentrate which is enriched with or concentrated with respect to a desired unsaturated fatty acid and which is prepared from a specific conjugated fatty acid mixture. The method of the present invention includes a step of mixing a conjugated fatty acid mixture (A) with at least one unsaturated fatty acid (B) to thus form a mixed solution.

As the conjugated fatty acids included in the mixture (A), there may be listed, for instance, conjugated linoleic acids, conjugated linolenic acids, conjugated eicosapentaenoic acid, conjugated docosahexaenoic acid, stillingic acid, and dimorphenolic acid. Preferably used herein are $C_{16}$-$C_{20}$ conjugated unsaturated fatty acids, with conjugated linoleic acids being more preferred.

The unsaturated fatty acids (B) preferably used herein may be, for instance, $C_4$-$C_{14}$ unsaturated fatty acids such as isocrotonic acid, caproleic acid, myristoleic acid, palmitoleic acid, oleic acid, asclepic acid, linoleic acid and linolenic acid. Moreover, more preferably used herein are $C_6$-$C_{14}$ saturated fatty acids such as hexanoic acid, octanoic acid, decanoic acid, lauric acid and myristic acid. Still more preferably used herein are an unsaturated fatty acid having one cis-double bond such as myristoleic acid, palmitoleic acid, oleic acid, asclepic acid, linoleic acid and linolenic acid. Moreover, even more preferably used herein are oleic acid. These unsaturated fatty acids (B) may be used alone or in any combination of at least two of them.

When mixing the mixture (A) with at least one unsaturated fatty acid (B), it is preferred to prepare a mixed solution containing a desired isomer (a) to be converted into a concentrate. An organic solvent may be used when mixing these components. In this respect, such organic solvent may be any one insofar as it may dissolve fatty acid at normal temperature of the solvent and has a melting point lower than cooling temperature of the mixture, but examples of organic solvents preferably used herein are ketones (such as acetone and methyl ethyl ketone); hydrocarbons (such as hexane and petroleum ether); aromatic hydrocarbons (such as benzene and toluene); alcohols (such as methanol, ethanol and propanol); water (moisture)-containing alcohols; ethers (such as diethyl ether); and esters (such as ethyl acetate). More preferably used herein are, for instance, acetone, hexane, alcohols and water (moisture)-containing alcohols, with acetone being most preferably used.

The mixing ratio of the mixture (A) and the at least one unsaturated fatty acid (B) corresponds to not less than 15 parts by mass of the at least one unsaturated fatty acid (B) per 100 parts by mass of the mixture (A). More preferably, the amount of the at least one unsaturated fatty acid (B) ranges from 20 to 100 parts by mass per 100 parts by mass of the mixture (A).

The method of the present invention is effective when the desired isomer (a) is a conjugated fatty acid having a cis-configuration existing at any position between 4-position and 16-position thereof. Examples of such conjugated fatty acids each having a cis-configuration existing at any position between 4-position and 16-position thereof preferably used in the method of the present invention are conjugated linoleic acid, conjugated linolenic acid, conjugated icosapentaenoic acid, conjugated docosahexaenoic acid, stillingic acid and dimorphenolic acid. More preferably used herein are conjugated linoleic acids and further preferably used herein are 9-cis, 11-trans conjugated linoleic. In addition, the method of the present invention is effective when the mixture (A) contains a conjugated fatty acid whose position of the cis-configuration is different from that of the cis-configuration of the isomer (a) by not less than 2 positions. Moreover, the method of the present invention is effective when the mixture (A) contains at least two kinds of conjugated fatty acids. The method is more effective when the at least two kinds of conjugated fatty acids comprise at least two kinds of conjugated linoleic acids and it is most effective in cases where the at least two kinds of conjugated linoleic acids comprise 9-cis, 11-trans conjugated linoleic acid and 10-trans, 12-cis conjugated linoleic acid.

The method of the present invention further comprises a step of crystallizing crystals rich in the isomer (a) from the mixed solution or crystals poor in the isomer (a) from the mixed solution.

The term "crystals rich in the isomer (a)" herein used means that the ratio of the content of the isomer (a) to that of other isomer of the crystals is higher than that of the mixture (A). In this respect, said ratio of the crystals is preferably not less than 1.2 time, more preferably not less than 1.3 time and most preferably not less than 1.5 time that of the mixture (A). In addition, the term "crystals poor in the isomer (a)" herein used means that the ratio of the content of the isomer (a) to that of other isomer of the crystals is lower than that of the mixture (A). In this connection, said ratio of the crystals is preferably not more than 0.8 time, more preferably not more than 0.7 time and most preferably not more than 0.65 time that of the mixture (A).

The crystallization method usable herein may be ones similar to those currently used for treating the usual fats and fatty oils or fatty acids and may be, for instance, the crystallization method through cooling. The crystallization temperature may vary depending on various factors such as the kinds of conjugated fatty acids to be concentrated and unsaturated fatty acids to be added as well as the presence of a solvent, and the kind and concentration thereof, but it ranges from 4 to −60° C., preferably −10 to −50° C. and more preferably −20 to −45° C., under conditions such that three volumes of acetone solvent are used, which are conditions currently used for the separation of fatty acids through cooling. A solvent is not necessarily used in the crystallization and separation, but it is desirable to carry out the operation while adding an appropriate solvent. Examples of such solvents usable in this operation are ketones (such as acetone and methyl ethyl ketone); hydrocarbons (such as hexane and petroleum ether); aromatic hydrocarbons (such as benzene and toluene); alcohols (such as methanol, ethanol and propanol); water (moisture)-containing alcohols; ethers (such as diethyl ether); and esters (such as ethyl acetate). More preferably used herein are, for instance, acetone, hexane, alcohols and water (moisture)-containing alcohols, with acetone being most preferably used. The amount of the solvent to be added is not less than 10 parts by mass, preferably 50 to 1000 parts by mass and more preferably 100 to 500 parts by mass per 100 parts by mass of the mixed solution (the sum of the masses of the mixture (A) and the unsaturated fatty acid (B)).

The method of the present invention further comprises a solid-liquid separation step for recovering crystals rich in the isomer (a) or for removing the crystals poor in the isomer (a) to recover a solution rich in the isomer (a). Thus, the method according to the present invention would permit a concentrate enriched with a desired isomer.

The term "solution rich in the isomer (a)" herein used means that the ratio of the content of the isomer (a) to that of other isomer of the solution is higher than that of the mixture (A). In this respect, said ratio of the solution is preferably not less than 1.1 time, more preferably not less than 1.2 time and most preferably not less than 1.5 time that of the mixture (A). In addition, the term "solution poor in the isomer (a)" herein used means that said ratio of the content of the isomer (a) to that of other isomer of the solution of the solution is lower than that of the mixture (A). In this connection, said ratio of the solution is preferably not more than 0.85 time, more preferably not more than 0.7 time and most preferably not more than 0.6 time that of the mixture (A).

The solid-liquid separation method usable herein may be ones similar to those currently used for treating the usual fats and fatty oils or fatty acids and may be, for instance, the filtration technique, the centrifugation technique, and the sedimentation-separation technique, which may be either a batch-wise method or a continuous method.

The method of the present invention may likewise include an additional step for removing the unsaturated fatty acid (B) and/or the organic solvent used subsequent to the foregoing solid-liquid separation step for the removal of the unsaturated fatty acid (B) and/or the organic solvent present in the resulting concentrate.

The method for removing such substances which can be used herein may be ones similar to those currently used for treating the usual fats and fatty oils or fatty acids and may be, for instance, the distillation technique, the fractionation technique while making use of a surfactant and the chromatography technique, with the distillation technique being desirable in the present invention.

Further, according to the method of the present invention, the foregoing processing steps can be repeated over a desired time to thus obtain a concentrate having a high degree of concentration.

The present invention also relates to a method for preparing an esterified product which comprises the step of esterifying a compound carrying, in the molecule, at least one alcoholic hydroxyl group using the concentrate enriched with an isomer of a conjugated fatty acid according to the present invention. This method will hereunder be described in detail below.

Such a compound carrying at least one alcoholic hydroxyl group in the molecule may be various kinds of compounds including, for instance, a variety of mono-alcohols, polyhydric alcohols and aminoalcohols. Specific examples thereof are polyhydric alcohols such as short chain, middle chain and long chain, saturated or unsaturated, linear or branched alcohols, glycols, glycerin and erythritols. Among these polyhydric alcohols, glycerin is preferably used in the present invention.

The esterification reaction may be carried out under conditions similar to those disclosed in, for instance, Japanese Un-Examined Patent Publication Nos. Hei 13-169795 and Hei 15-113396. By way of example, the esterification may be carried out by the addition of a lipase to a reaction system, which comprises a mixture of a compound carrying at least one alcoholic hydroxyl group in the molecule and the concentrate enriched with an isomer of a conjugated fatty acid according to the present invention, in an amount ranging from 0.1 to 2% by mass on the basis of the total mass of the mixture and the subsequent reaction of these substances at a temperature ranging from 30 to 60° C. for a time ranging from 24 to 72 hours. At this stage, the esterification is preferably carried out while the water formed during the esterification reaction is removed by reducing the pressure of the reaction system.

EXAMPLES

1. Materials and Analytical Methods

The materials and the analytical devices used in the following Examples are as follows:

(1) Materials (Starting Materials)

Conjugated linoleic acid CLA-80HG (available from The Nisshin OilliO Group, Ltd.);

Oleic acid (18:1) (available from Tokyo Chemical Industries, Ltd.);

Acetone (special grade) (available from NAKARAI Tesk Co., Ltd.);

Glycerin (available from Wako Pure Chemical Industries, Ltd.);

Lipase QLM (available from Meito Sangyo Co., Ltd.);

Lipase RM (Prepared according to the method disclosed in Japanese Patent Application Serial No. 2004-114443 filed by the instant Applicant)

(2) Analytical Device

Gas Chromatograph (GC-2010) (available from Shimadzu Corporation); and

Column: DB-23 (30 m×0.25 μm×0.25 mm) (available from Agilent Technologies Corporation).

2. Analytical Methods (1) Method for Analyzing Isomers:

After a 14% boron trifluoride methanol complex methanol solution were used to methyl-esterify, the resulting methyl ester mixture were analyzed according to the GLC (gas-liquid chromatography) technique while making use of a column: DB-23 (30 m×0.25 μm×0.25 mm) (available from Agilent Technologies Corporation).

(2) Conditions for GLC Analysis

Instrument: GC-2010 (available from Shimadzu Corporation);
Column used: DB-23 (available from Agilent Technologies Corporation) having a size of 30 m×0.25 μm×0.25 mm;
Detector: FID;
Carrier Gas: He (flow rate of 1 mL/min);
Split Ratio: 100:1;
Column Temp.: 220° C. at a rate of 2° C./min;
Temp at Injection Port: 250° C.;
Temp. of Detector: 250° C.

3. Method for Concentrating Isomers

The term "purity of isomer" used in the following description means the quantity specified by the following equation:

Purity of Isomer=(Amt. or Conc. of Desired Isomer(s))/(Amt. or Conc. of all of the Isomers)

In addition, various isomers of conjugated linoleic acid will be represented by the following symbols:

9c11t: 9-cis, 11-trans conjugated linoleic acid;
10t12c: 10-trans, 12-cis conjugated linoleic acid;
9c 11c: 9-cis, 11-cis conjugated linoleic acid;
10c 12c: 10-cis, 12-cis conjugated linoleic acid;
tt: Sum of 9-trans, 11-trans conjugated linoleic acid and 10-trans, 12-trans conjugated linoleic acid

Comparative Example 1

1500 g of acetone was added to 500 g of a conjugated linoleic acid CLA-80HG-1 weighed to thus give a solution, followed by allowing the resulting solution to cool at −20° C. overnight with stirring. Then the solution was fractionated into a solid phase and a liquid phase through filtration under reduced pressure, followed by the removal of the acetone from the solid and liquid phases through distillation to thus give 19 g of a solid fraction 1 (Solid 1) and 480 g of a liquid fraction 1 (Liquid 1) respectively. The results are listed in the following Table 1. The resulting solid and liquid fractions did not undergo any change in the purity of isomers and any concentrate of a specific isomer of the foregoing acid could not be obtained.

TABLE 1

| | Purity of Isomer | | Amt. of CLA | Composition of Fatty Acid (%) | | | | | |
| --- | --- | --- | --- | --- | --- | --- | --- | --- | --- |
| | 9c11t | 10t12c | (%) | C16:0 + C18:0 | 9c 11t | 10t 12c | 9c 11c | 10c 12c | tt |
| CLA-80HGR | 0.46 | 0.47 | 80.5 | 7.5 | 37.2 | 38.2 | 1.2 | 1.4 | 2.5 |
| Solid 1 | 0.39, 0.85 time | 0.48, 1.02 time | 24.2 | 66.9 | 9.4 | 11.6 | 0.4 | 0.5 | 2.3 |
| Liquid 1 | 0.46, 1.00 time | 0.47, 1.00 time | 85.4 | 3.4 | 39.3 | 40.4 | 1.3 | 1.5 | 2.5 |

Comparative Example 2

60 g of acetone was added to 20 g of a conjugated linoleic acid CLA-80HG-1 weighed to thus give a solution, followed by allowing the resulting solution to stand at −30° C. overnight. Then the solution was fractionated into a solid phase and a liquid phase through filtration under reduced pressure, followed by the removal of the acetone from the solid and liquid phases through distillation to thus give 6.7 g of a solid fraction 2 (Solid 2) and 12.5 g of a liquid fraction 2 (Liquid 2) respectively. The results are listed in the following Table 2. The resulting solid and liquid fractions did not undergo any change in the purity of isomers and any concentrate of a specific isomer of the foregoing acid could not be obtained.

TABLE 2

| | Purity of Isomer | | Amt. of CLA | Composition of Fatty Acid (%) | | | | | |
| --- | --- | --- | --- | --- | --- | --- | --- | --- | --- |
| | 9c11t | 10t12c | (%) | C16:0 + C18:0 | 9c 11t | 10t 12c | 9c 11c | 10c 12c | tt |
| CLA-80HGR | 0.46 | 0.47 | 80.5 | 7.5 | 37.2 | 38.2 | 1.2 | 1.4 | 2.5 |
| Solid 2 | 0.53, 1.15 time | 0.43, 0.91 time | 76.7 | 14.9 | 41.0 | 33.3 | 0.5 | 0.5 | 1.4 |
| Liquid 2 | 0.43, 0.93 time | 0.50, 1.06 time | 84.3 | 2.6 | 36.0 | 41.9 | 1.6 | 1.8 | 3.0 |

Comparative Example 3

30 g of acetone was added to 10 g of the liquid fraction 1 prepared in Comparative Example 1 weighed to thus give a solution, followed by allowing the resulting solution to stand at −30° C. overnight. Then the solution was fractionated into a solid phase and a liquid phase through filtration under reduced pressure, followed by the removal of the acetone from the solid and liquid phases through distillation to thus give 4.0 g of a solid fraction 3 (Solid 3) and 5.5 g of a liquid fraction 3 (Liquid 3) respectively. The results are listed in the following Table 3. The resulting solid and liquid fractions did not undergo any change in the purity of isomers and any concentrate of a specific isomer of the foregoing acid could not be obtained.

TABLE 3

| | Purity of Isomer | | Amt. of CLA | Composition of Fatty Acid (%) | | | | | |
|---|---|---|---|---|---|---|---|---|---|
| | 9c11t | 10t12c | (%) | C16:0 + C18:0 | 9c 11t | 10t 12c | 9c 11c | 10c 12c | tt |
| CLA-80 HGR | 0.46 | 0.47 | 80.5 | 7.5 | 37.2 | 38.2 | 1.2 | 1.4 | 2.5 |
| Liquid 1 | 0.46 | 0.47 1.00 time | 85.4 | 3.4 | 39.3 | 40.4 | 1.3 | 1.5 | 2.5 |
| Solid 3 | 0.53, 1.15 time | 0.44, 0.94 time | 86.4 | 5.1 | 45.7 | 38.1 | 0.7 | 0.7 | 1.2 |
| Liquid 3 | 0.41, 0.89 time | 0.50, 1.06 time | 83.9 | 1.6 | 34.2 | 42.3 | 1.8 | 2.1 | 3.5 |

(ii) Method for the Concentration of Isomers

Example 1

5 g of oleic acid and 30 g acetone were added to 15 g of the liquid fraction 1 (Liquid 1) prepared in Comparative Example 1 weighed to thus prepare a mixed solution, followed by allowing the resulting solutions to stand at −20° C. overnight with cooling. Then the solution was separated into a solid fraction and a liquid fraction through decantation and then the acetone was removed from the solid and liquid fractions through distillation to thus give 6.6 g of a solid fraction 4 (Solid 4) and 3.0 g of a liquid fraction 4 (Liquid 4), respectively. The following Table 4 shows the results concerning yields thus obtained, the purity of isomers and the compositions of fatty acids and the results of Comparative Example 3. Regarding the solid fractions, there were observed significant differences in the purities of isomers, comparing with that of Comparative Example 3, that is, the purities of a 9c11t isomer increased

TABLE 4

| | Purity of Isomer | | CLA | Composition of Fatty Acid (%) | | | | |
|---|---|---|---|---|---|---|---|---|
| | 9c11t | 10t12c | (%) | 9c 11t | 10t 12c | 9c 11c | 10c 12c | tt |
| Liquid 1 | 0.46 | 0.47 | 85.4 | 39.3 | 40.4 | 1.3 | 1.5 | 2.5 |
| Solid 3 | 0.53, 1.15 time | 0.44, 0.94 time | 86.4 | 45.7 | 38.1 | 0.7 | 0.7 | 1.2 |
| Solid 4 | 0.62 1.35 time | 0.32 0.68 time | 21.6 | 13.4 | 6.9 | 0.2 | 0.2 | 0.8 |
| Liquid 4 | 0.43 0.93 time | 0.51 1.09 time | 47.1 | 20.3 | 23.8 | 0.7 | 0.7 | 1.7 |

Example 2

210 g of oleic acid and 2100 g acetone were added to 490 g of the liquid fraction 1 (Liquid 1) prepared in the same condition as that of Comparative Example 1 weighed to thus prepare a mixed solution, followed by allowing the resulting solutions to cool at 25° C. for 4 hours with stirring. Then the solution was separated into a solid fraction and a liquid fraction through filtration under reduced pressure and then the acetone was removed from the solid and liquid fractions through distillation to thus give 191 g of a solid fraction 5 (Solid 5) and 508 g of a liquid fraction 5 (Liquid 5), respectively. The following Table 5 shows the results concerning the purity of isomers and the compositions of fatty acids and the results of Comparative Example 3. Regarding the solid fractions, there were observed significant differences in the purities of isomers, comparing with that of Comparative Example 3, that is, the purities of a 9c11t isomer increased.

TABLE 5

| | Purity of Isomer | | CLA | Composition of Fatty Acid (%) | | | | |
|---|---|---|---|---|---|---|---|---|
| | 9c11t | 10t12c | (%) | 9c 11t | 10t 12c | 9c 11c | 10c 12c | tt |
| Liquid 1 | 0.46 | 0.47 | 85.4 | 39.3 | 40.4 | 1.3 | 1.5 | 2.5 |
| Solid 3 | 0.53, 1.15 time | 0.44, 0.94 time | 86.4 | 45.7 | 38.1 | 0.7 | 0.7 | 1.2 |
| Solid 5 | 0.70 1.52 time | 0.28 0.60 time | 58.6 | 40.8 | 16.5 | 0.4 | 0.4 | 0.5 |
| Liquid 5 | 0.41 0.89 time | 0.56 1.19 time | 63.1 | 25.5 | 35.2 | 0.8 | 0.8 | 0.8 |

Example 3

575 g acetone were added to 191 g of the solid fraction 5 (Solid 5) prepared in Example 2 weighed to thus prepare a mixed solution, followed by allowing the resulting solutions to cool at −24° C. for 4 hours with stirring. Then the solution was separated into a solid fraction and a liquid fraction through filtration under reduced pressure and then the acetone was removed from the solid and liquid fractions through distillation to thus give 40 g of a solid fraction 6 (Solid 6) and 144 g of a liquid fraction 5 (Liquid 6), respectively. The following Table 6 shows the results concerning the purity of isomers and the compositions of fatty acids and the results of Solid 5. Regarding the solid fractions, there were observed significant differences in the purities of isomers, comparing with that of Solid 5, that is, the purities of a 9c11t isomer increased.

TABLE 6

| | Purity of Isomer | | CLA | Composition of Fatty Acid (%) | | | | | |
| --- | --- | --- | --- | --- | --- | --- | --- | --- | --- |
| | 9c11t | 10t12c | (%) | 9c 11t | 10t 12c | 9c 11c | 10c 12c | tt |
| Liquid 1 | 0.70 1.52 time | 0.28 0.60 time | 58.6 | 40.8 | 16.5 | 0.4 | 0.4 | 0.5 |
| Solid 6 | 0.90 1.34 time | 0.05 0.18 time | 53.9 | 50.6 | 2.8 | 0.1 | 0.1 | 0.3 |
| Liquid 6 | 0.64 0.91 time | 0.35 1.25 time | 63.0 | 37.8 | 20.5 | 0.0 | 0.4 | 0.5 |

Example 4

To a reaction container equipped with a stirring machine, there were added 2 g of glycerin and 18 g of the solid fraction prepared in the same process as that of Example 1, followed by the addition of 40 mg of Lipase QLM and 160 mg of Lipase RM with stirring. The reaction of these components was carried out at 60° C. and a pressure of 10 Torr over 24 hours to thus form 18 g of a triglyceride. The resulting triglyceride was found to have a triglyceride concentration of 94% and an acid value of 2.9.

What is claimed is:

1. A method for preparing a concentrate of a desired isomer (a) from a conjugated fatty acid mixture (A), wherein the method comprises the steps of mixing the conjugated fatty acid mixture (A) with at least one unsaturated fatty acid (B) to obtain a mixed solution containing the desired isomer (a) dissolved therein; crystallizing crystals rich in the isomer (a) from the mixed solution or crystals poor in the isomer (a) from the mixed solution; and solid-liquid separating for recovering crystals rich in the isomer (a) or for removing the crystals poor in the isomer (a) to recover a solution rich in the isomer (a).

2. The method of claim 1, wherein an organic solvent is used in the step of mixing the conjugated fatty acid mixture (A) with the at least one unsaturated fatty acid (B).

3. The method of claim 1, wherein the mixing ratio of the conjugated fatty acid mixture (A) and the at least one unsaturated fatty acid (B) corresponds to 1 to 15 parts by mass of the at least one unsaturated fatty acid (B) per 100 parts by mass of the conjugated fatty acid mixture (A).

4. The method of claim 1, wherein the isomer (a) is an unsaturated fatty acid having a cis-configuration existing at any position between the 4-position and the 16-position thereof.

5. The method of claim 1, wherein the position of the cis-configuration of the conjugated fatty acid mixture (A) is different from that of the isomer (a) by 2 positions or more.

6. The method of claim 1, wherein the conjugated fatty acid mixture (A) comprises at least two isomers of conjugated linoleic acid.

7. The method of claim 1, wherein the conjugated fatty acid mixture (A) comprises 9-cis, 11-trans conjugated linoleic acid and 10-trans, 12-cis conjugated linoleic acid.

8. The method of claim 1, wherein the unsaturated fatty acid (B) is $C_{14}$-$C_{20}$ unsaturated fatty acid.

9. The method of claim 1, wherein the unsaturated fatty acid (B) is an unsaturated fatty acid having one cis-double bond.

10. The method of claim 1, wherein the unsaturated fatty acid (B) is oleic acid.

11. The method of claim 1, wherein the isomer (a) is conjugated linoleic acid.

12. The method of claim 1, wherein the isomer (a) is 9-cis, 11-trans conjugated linoleic acid.

13. The method of claim 2, wherein the organic solvent is acetone.

14. A method for preparing an ester comprising the step of esterifying a compound having at least one alcoholic hydroxyl group in the molecule with a condensate of an unsaturated fatty acid prepared according to the method of claim 1.

15. The method of claim 14, wherein the compound having at least one alcoholic hydroxyl group in the molecule is glycerin.

* * * * *